UNITED STATES PATENT OFFICE.

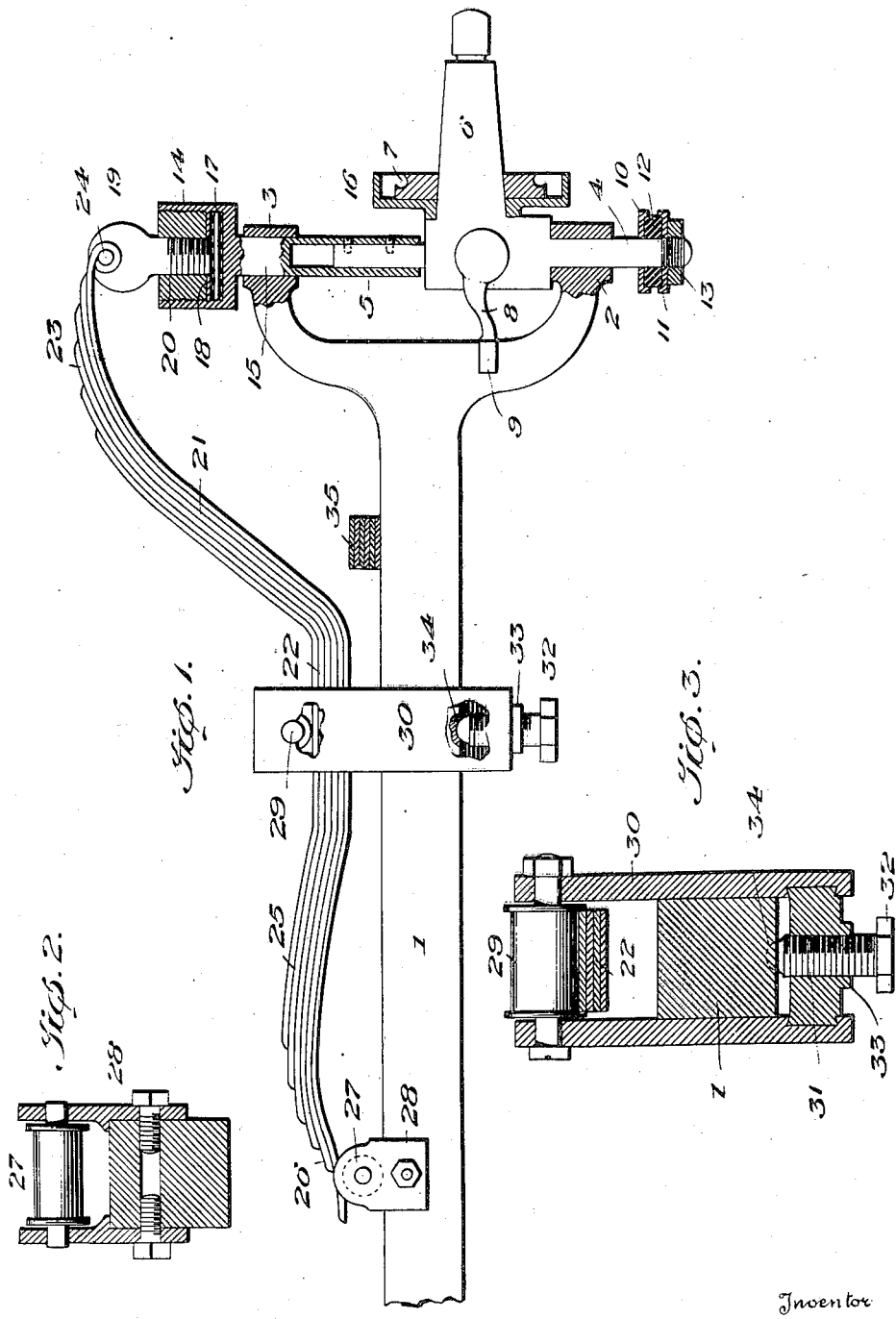

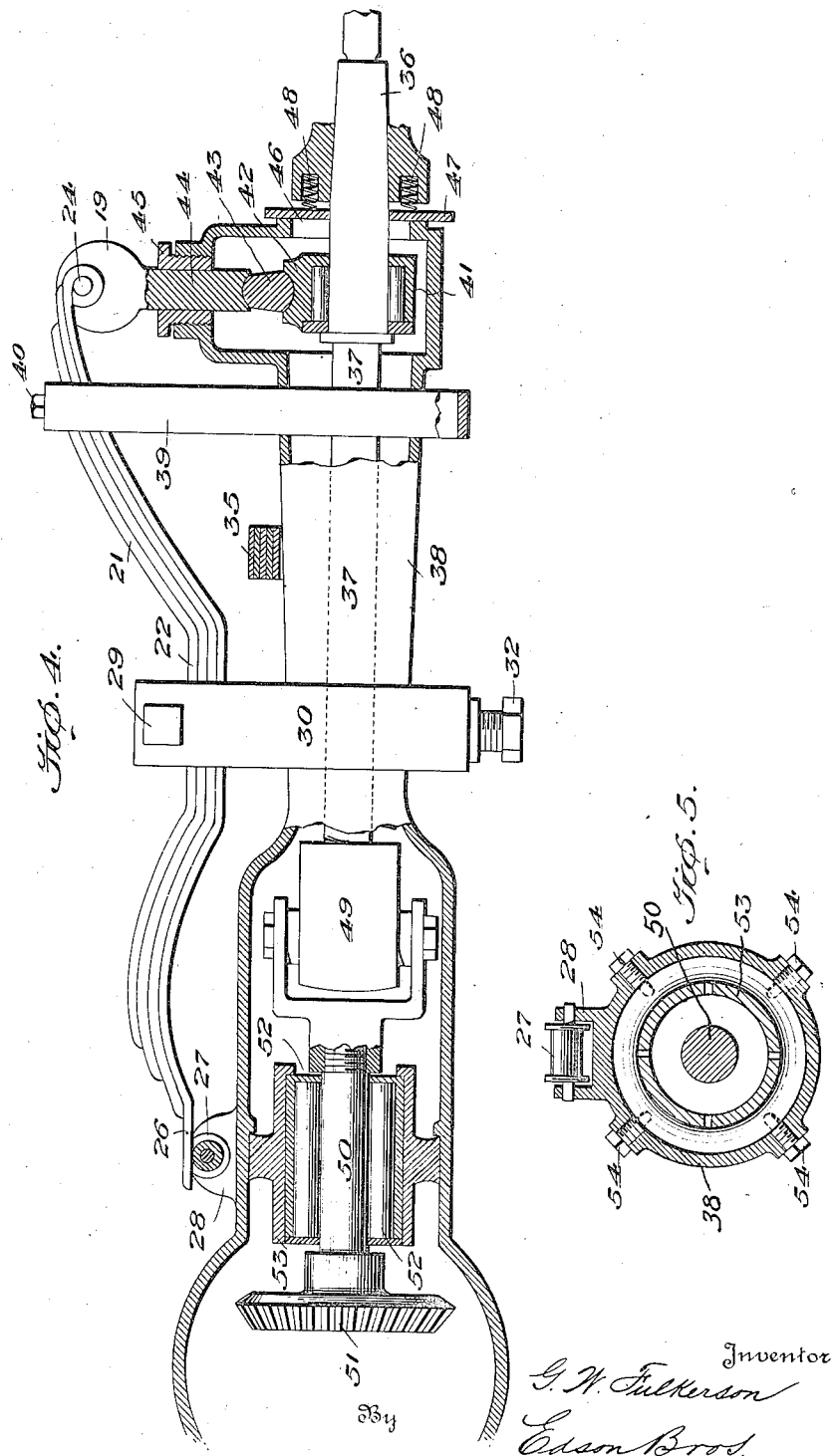

GEORGE W. FULKERSON, OF HAGERSTOWN, INDIANA.

SHOCK-ABSORBER.

1,299,165. Specification of Letters Patent. Patented Apr. 1, 1919.

Application filed February 10, 1917. Serial No. 147,848.

*To all whom it may concern:*

Be it known that I, GEORGE W. FULKERSON, a citizen of the United States, residing at Hagerstown, in the county of Wayne and State of Indiana, have invented certain new and useful Improvements in Shock-Absorbers; and I do hereby declare the following to be a full, clear, and exact description of the invention, such as will enable others skilled in the art to which it appertains to make and use the same.

This invention is a suspension mechanism for vehicles, having for its principal object to provide a cushion for the body of the vehicle, to thereby prevent excessive vibration of the body of the vehicle by taking up such vibrations or shocks in the wheels of the vehicle.

A further aim of this invention is to preclude the necessity for the employment of pneumatic tires by the provision of a simple, efficient, and economical structure which may be employed independently of, or as a cushioning device in addition to, the ordinary spring suspension device of vehicles.

The invention comprises a novel form of axle construction in which a plurality of resilient means, which may be in the form of semi-elliptical springs, are positioned parallel with the axle beams of the vehicles, the springs being retained in position by anti-friction devices of novel form. Means are provided also for regulating the tension of the resilient elements.

The foregoing objects of the invention, and other aims thereof will become apparent from the following detail description taken in connection with the accompanying drawings and the appended claims.

While a preferred embodiment of the invention is shown in the drawings, it is to be understood that the construction therein set forth is for the purposes of illustration only, and not as defining the limits of the invention.

In the drawings:—

Figure 1 is a side elevation, parts being broken away, of a portion of a front axle of a vehicle, disclosing the mounting of a resilient member thereon.

Fig. 2 is a detail sectional view of an end supporting member for the resilient member.

Fig. 3 is a detail sectional view of an adjusting saddle.

Fig. 4 is a sectional view of a portion of a rear axle with cushioning means mounted thereon.

Fig. 5 is a detail view showing means to hold an inner sleeve in position.

The suspension devices are preferably arranged in pairs on each axle beam or axle casing, a suspension device being preferably employed for each wheel, whereby the vibration or shocks incident to running over rough places in the roadway, may be taken up at the wheels instead of being communicated to the body of the vehicle. These resilient elements are preferably employed in addition to the usual spring suspension devices for the body of the vehicle, thereby relieving the pneumatic tires of the vehicle (if they are used) from the strain incident to sudden shock. It is obvious that such suspension devices prevent the bursting of pneumatic tires, and when such resilient elements are employed in addition to the ordinary spring suspension devices, solid rubber tires may be substituted for pneumatic tires.

Referring more particularly to the specific embodiment of the invention disclosed in the accompanying drawings, the front axle is shown mounted in Fig. 1 from an axle beam 1, which is provided with a forked end to provide a lower bearing 2 and an upper bearing 3. Slidably mounted in the lower bearing is a spindle arm 4, while another spindle arm 5 extends in the direction of the upper bearing 3. The spindle, comprising the arms 4 and 5, supports the ordinary axle 6 for one of the front wheels, the usual ball-bearing cup being indicated at 7. To this spindle 4, 5, there may be connected a spindle arm 8 having an eye 9, or any equivalent device, for connecting the spindle arm 8 with the steering gear of the vehicle. The lower end of the spindle arm 4 may be threaded for a portion of its length, and is designed to receive a plurality of washers 10 and 11, which washers serve to house a suitable resilient element indicated at 12, which may be of rubber, if desired. The washer 10 may be slidably mounted upon the spindle arm 4, if found desirable, and these washers 10 and 11 are retained on the spindle arm 4 by any suitable means, such as a nut 13. This resilient element 12 is designed to cushion the movement of the spindle arm 4 in an upward direction should the wheel of the vehicle run over an obstruction in the road, causing the axle 6 to move upwardly with relation to the axle beam 1, and thereby force the washer 10 into sudden contact with the bearing 2 of the axle beam. Any shock due to this contact will be taken up by the resilient element 12.

In the upper bearing 3 of the axle beam, there is shown mounted a suitable cup 14 which may have a depending sleeve 15. This sleeve may have telescopic engagement with the upper spindle arm 5 and may be keyed thereto by any suitable means, such as the key screws 16. It will be understood that the sleeve 15 is capable of vertical and rotative movements within the spindle arm 4 to accommodate the vertical and rotative movements of the spindle arm 5.

The cup 14 receives a plurality of ball-bearings 17 for a bearing plate 18, to which is secured a rotatable head 19, whereby the head may be swiveled relative to the rotatable sleeve 15, in order that the head may be maintained at a predetermined position relative to the shaft beam, irrespective of the twisting movements of the axle 6, and the spindle arms 4 and 5. If desired, the cup 14 may be provided with a suitable bushing 20.

Suitably connected with the rotatable head 19 is a resilient element 21 shown as a substantially semi-elliptical spring of the leaf spring type. This spring may be of any preferred form, but is shown as having a straight horizontal portion 22 and upwardly directed portion terminating in a curved section 23, where the spring may be connected at 24 to the head 19, and a rearwardly arcuate section 25. The resilient element 21 is so mounted that it is capable of longitudinal movement relative to the axle beam 1, and its free end 26 may ride upon an anti-friction device, such as a roller 27, shown in Figs. 1 and 2. This roller 27 may be secured in any desired manner to the axle beam 1, as by the bracket 28. It is preferred to mount the resilient element 21 on the upper portion of the axle beam 1, and to provide anti-friction devices to engage the upper and lower surfaces of the resilient element 21. The anti-friction device 27 is shown engaging the lower surface of this element 21 and the anti-friction device, such as a roller 29, disclosed in Figs. 1 and 3, is shown contacting with the upper surface of the horizontal section 22 of the resilient element 21, whereby the longitudinal movement of the resilient element 21 relative to the axle beam 1, may be guided by the anti-friction rollers 27 and 29, when the resilient element 21 is placed under tension due to the distortion of the axle 6 relative to the axle beam 1.

The anti-friction roller 29 is preferably mounted in a saddle 30, which is preferably so mounted that it will be positioned to coöperate with the horizontal section 22 of resilient element 21. This saddle may be of any desired form, but is shown as being provided with a base section 31 through which may be mounted an adjusting screw 32, having a binding nut 33. This adjusting screw 32 is designed to bear against the axle beam 1, or its equivalent, to cause the roller bearing 29 to exert more or less pressure upon the resilient element 21 to thereby regulate the tension of said resilient element. The adjusting screw 32 may have a conical bearing point 34, whereby the screw may maintain the saddle 30 in a predetermined position relative to the axle beam 1, or its equivalent, it being understood that the beam 1 may be provided with concave recesses to receive the point 34 of the screw 32.

The front and rear axle beams may mount the usual springs 35 of the vehicle, in the usual manner.

Referring more particularly to Figs. 4 and 5 of the drawings, the rear axle construction is provided with a resilient element 21 similar to that disclosed in Fig. 1 for the front axle construction, and this resilient element is shown fastened at one end 24 to a slidable head 19, with its other end unconfined by resting upon an anti-friction roller 27. The resilient straight section 22 of the resilient element is shown coöperating with an anti-friction roller 29 of the saddle tension device 30, which is provided with the adjusting screw 32, as previously described. The axle 36 for the rear wheels is shown mounted on the drive shaft 37, which is rotatably positioned within the axle casing 38, to which the saddle 30 and the bracket 28 may be secured.

Coöperating with the resilient element 21, there may be employed a suitable bridle 39, which may be of any suitable material, which bridle is designed to serve as a check on the resilient element 21 to any excessive shock which may be incident to rough roadways. It is obvious that the bridle 39 may be used on the front axle construction as well as the rear axle construction, if desired. This bridle 39 may be adjustably mounted relative to the resilient element 21 and the axle casing 38 by any suitable means, such as an adjusting nut 40.

The axle 36 may be provided with a roller bearing 41 mounted in a suitable casing, and this bearing casing may be provided with a bearing yoke 42, having a recess to receive a conical bearing element 43, which is shown supporting a shank 44 of the slidable head 19, the shank being positioned in a bushing 45. The shaft 37 is capable of limited play or movement within the casing 38, and to accommodate this movement, the end of the casing 38 is provided with an enlarged opening 46, which may be closed with a disk or washer 47, which may be maintained in position by any suitable means, such as the coiled springs 48.

The drive shaft may be provided also with a universal joint 49 of any desired form, to connect the drive shaft 37 with an auxiliary shaft 50 carrying the usual gear 51. This auxiliary shaft 50 may be provided with suitable roller bearings 52 concealed within a casing 53. The casing 53 may be of the sectional type and the axle casing 38 may be provided with a plurality of adjusting screws 54 to maintain the position of the bearing relative to the auxiliary shaft 50.

It is obvious that various changes and alterations may be made in the form and proportion of parts and in the specific arrangement of the parts, from that disclosed in the accompanying drawings, and the right is reserved to make such changes and alterations as fairly fall within the scope of the appended claims.

Having thus described my invention, what is claimed as new is:—

1. In a suspension mechanism for vehicles, an axle, a resilient element positioned parallel and sustained at one end with relation to the axle, and having the other end thereof free to move longitudinally, and means to regulate the tension of the resilient element.

2. In a suspension mechanism for vehicles, an axle provided with a resilient element fastened at one end to a movable support carried by the axle, the other end of the resilient element being unconfined, an anti-friction device to support the unconfined end of the resilient element, and means to regulate the tension of the resilient element.

3. In a suspension mechanism for vehicles, the combination with an axle, and resilient means associated therewith, of an auxiliary resilient element secured at one end relatively to the axle and positioned longitudinally thereof, said auxiliary resilient element being provided with means for regulating its tension.

4. In a suspension mechanism for vehicles, the combination with an axle and resilient means associated therewith, of an auxiliary resilient element arranged on said axle and parallel therewith, said resilient element being in the form of a semi-elliptical spring, which is secured at one end by means carried by the axle and is free to move longitudinally at the other end, anti-friction means to support the auxiliary resilient element at the other end, and means to engage the auxiliary resilient element at a point intermediate the ends thereof.

5. In a device of the class described, the combination with an axle beam for the wheels of a vehicle, of a resilient element positioned parallel to the axle beam near each wheel thereof, said resilient element having non-alined sequential portions and being capable of extension longitudinally of the axle, and means associated with the axle to retain one end of the resilient element in a predetermined position.

6. In a device of the class described, an axle supporting member or beam carrying a slidable head, an elongated resilient element positioned longitudinally of the axle supporting member or beam and secured near one end to the slidable head, said resilient element being capable of longitudinal movement relative to the axle supporting member or beam, an anti-friction device to support the resilient element near its other end, and means positioned intermediate the ends of the resilient element to guide the same in its longitudinal movement.

7. In a device of the class described, an axle supporting member or beam carrying a slidable head, an elongated resilient element positioned longitudinally of the axle supporting member or beam, and secured near one end to the slidable head, said resilient element being capable of longitudinal movement relative to the axle supporting member or beam, an anti-friction device to support the resilient element near its other end, and a saddle carried by the axle supporting member or beam to engage the resilient element intermediate the ends thereof to guide the same in its longitudinal movements, said saddle being provided also with means to adjust the tension of said resilient element.

8. In a device of the class described, an axle supporting member carrying a slidable head, an elongated resilient element positioned longitudinally of the axle supporting member and secured near one end to the slidable head, said resilient element being capable of longitudinal movement relative to the axle supporting member, anti-friction means to engage the resilient element near its other end, and a saddle carried by the axle supporting member to engage the resilient element intermediate the ends thereof to guide the same in its longitudinal movements, said saddle being provided also with an anti-friction device to engage the top of the elongated resilient element and with an adjusting screw to retain the pressure of the anti-friction device on the resilient element to thereby adjust the tension of the resilient element.

9. In a device of the class described, an axle supporting member or beam carrying a slidable head, an elongated resilient element positioned longitudinally of the axle supporting element or beam, and having one end thereof secured to the slidable head, said resilient element being capable of movement longitudinally of the axle, and having its other end free to ride upon an anti-friction device, and a saddle carried by the axle supporting member or beam to inclose the resilient element at a point substantially centrally of its ends, said saddle having an antifriction device to engage the resilient element and provided also with an adjusting screw to regulate the tension of the resilient element by varying the position of the antifriction device of the saddle relative to the axle support or beam.

10. In a device of the class described, an axle supporting member or casing for a drive shaft, a sectional sleeve positioned within the casing, each section being in contact with the inner wall of said casing to support and retain roller bearings for the shaft, and means to secure each of said sections in fixed relation to the casing, said securing means being accessible from without the casing.

11. In a suspension device for vehicles, an axle casing or beam, a head slidably mounted relative to the casing or beam, a resilient element secured to the slidable head and extending longitudinally of the casing or beam, anti-frictional devices positioned on opposite sides of the resilient element, and means to regulate the tension of the resilient element.

12. In a suspension device for vehicles, an axle casing having a head slidably mounted relative to the casing, a resilient element secured to the slidable head and extending longitudinally of the casing, anti-frictional devices to direct the resilient element in its longitudinal movements, and a check device for the resilient element when said element is subjected to excessive shock incident to rough roadways.

13. In a suspension device for vehicles, an axle casing, a drive shaft capable of rotation and limited vertical movements within the casing, a roller bearing carried by the shaft, a washer to close an end of the axle casing, a slidable head supported above the roller bearing, and a resilient element secured to the slidable head and mounted on the axle casing to cushion the movements of the drive shaft.

14. In a suspension device for vehicles, an axle casing, a drive shaft capable of rotation and limited vertical movements within the casing, a roller bearing for said shaft, a washer to close an end of the axle casing, means to maintain said washer against an end of the casing, a slidable head having a depending shank to support the head above the roller bearing, and a resilient element secured to the slidable head and mounted on the axle casing to cushion the movements of the drive shaft and its axles.

15. In a suspension device for vehicles, an axle casing, a drive shaft capable of rotation and limited vertical movement within the casing, a roller bearing for the shaft, said roller bearing being provided with a recessed bearing yoke, a substantially conical bearing fitting in the recess of the yoke, and serving to support a slidable head above the roller bearing, and a resilient element secured to the head and mounted on the axle casing to cushion the movements of the drive shaft relative to the casing.

In testimony whereof I affix my signature in presence of two witnesses.

GEORGE W. FULKERSON.

Witnesses:
GEORGE W. FRAZIER,
FRANK A. HAWKINS.